United States Patent
Meiring et al.

(10) Patent No.: US 7,651,850 B2
(45) Date of Patent: Jan. 26, 2010

(54) IMAGE AND PART RECOGNITION TECHNOLOGY

(75) Inventors: Jason E. Meiring, Austin, TX (US); Timothy B. Michaelson, Austin, TX (US); C. Grant Willson, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 387 days.

(21) Appl. No.: 10/847,635

(22) Filed: May 17, 2004

(65) Prior Publication Data

US 2005/0019796 A1 Jan. 27, 2005

Related U.S. Application Data

(60) Provisional application No. 60/471,102, filed on May 16, 2003.

(51) Int. Cl.
*C12M 1/36* (2006.01)
(52) U.S. Cl. .............. 435/286.2; 435/283.1; 435/287.9; 435/288.7; 436/518; 436/164; 427/10
(58) Field of Classification Search ................. None
See application file for complete search history.

(56) References Cited

U.S. PATENT DOCUMENTS

| | | |
|---|---|---|
| 3,844,895 A | 10/1974 | Rose et al. |
| 3,970,429 A | 7/1976 | Updike |
| 4,115,277 A | 9/1978 | Swank |
| 4,557,900 A | 12/1985 | Heitzmann |
| 4,623,461 A | 11/1986 | Hossom et al. |
| 4,681,742 A | 7/1987 | Johnson et al. |
| 4,703,017 A | 10/1987 | Campbell et al. |
| 4,734,372 A | 3/1988 | Rotman |
| 4,795,698 A | 1/1989 | Owen et al. |
| 4,828,386 A | 5/1989 | Matkovich et al. |
| 5,126,276 A | 6/1992 | Fish et al. |

(Continued)

FOREIGN PATENT DOCUMENTS

JP 09-105747 4/1997

OTHER PUBLICATIONS

U.S. Appl. No. 10/832,469 to Schmid et al., entitled "System and Method for the Detection of Analytes" filed Apr. 26, 2004.

(Continued)

*Primary Examiner*—N. C. Yang
(74) *Attorney, Agent, or Firm*—Medlen & Carroll, LLP

(57) ABSTRACT

A system and method for recognition of images may include the use of alignment markers. The image recognized may be a pattern from an array, a character, a number, a shape, and/or irregular shapes. The pattern may be formed by elements in an array such as an identification marking and/or a sensor array. More particularly, the system and method relate to discriminating between images by accounting for the orientation of the image. The size and/or location of alignment markers may provide information about the orientation of an image. Information about the orientation of an image may reduce false recognitions. The system and method of image recognition may be used with identification markings, biosensors, microfluidic arrays, and/or optical character recognition systems.

27 Claims, 5 Drawing Sheets

U.S. PATENT DOCUMENTS

| | | | |
|---|---|---|---|
| 5,137,833 A | 8/1992 | Russell |
| 5,143,853 A | 9/1992 | Walt |
| 5,156,810 A | 10/1992 | Ribi |
| 5,156,972 A | 10/1992 | Issachar |
| 5,162,863 A | 11/1992 | Ito |
| 5,188,934 A | 2/1993 | Menchen et al. |
| 5,219,763 A | 6/1993 | Van Hoegaerden |
| 5,240,640 A | 8/1993 | Siiman et al. |
| 5,244,636 A | 9/1993 | Walt et al. |
| 5,244,813 A | 9/1993 | Walt et al. |
| 5,250,264 A | 10/1993 | Walt et al. |
| 5,252,494 A | 10/1993 | Walt |
| 5,263,098 A | 11/1993 | Horikami |
| 5,307,144 A | 4/1994 | Hiroshi et al. |
| 5,366,860 A | 11/1994 | Bergot et al. |
| 5,382,512 A | 1/1995 | Smethers et al. |
| 5,405,784 A | 4/1995 | Van Hoegaerden |
| 5,408,535 A | 4/1995 | Howard, III et al. |
| 5,445,934 A | 8/1995 | Fodor et al. |
| 5,480,723 A | 1/1996 | Klainer et al. |
| 5,480,804 A | 1/1996 | Niwa et al. |
| 5,491,097 A | 2/1996 | Ribi et al. |
| 5,499,909 A | 3/1996 | Yamada et al. |
| 5,503,985 A | 4/1996 | Cathey et al. |
| 5,506,141 A | 4/1996 | Weinreb |
| 5,512,490 A | 4/1996 | Walt et al. |
| 5,518,887 A | 5/1996 | Parsons et al. |
| 5,550,373 A | 8/1996 | Cole et al. |
| 5,563,042 A | 10/1996 | Phillips et al. |
| 5,567,627 A | 10/1996 | Lehnen |
| 5,593,852 A | 1/1997 | Heller et al. |
| 5,597,531 A | 1/1997 | Liberti et al. |
| 5,608,519 A | 3/1997 | Gourley et al. |
| 5,616,790 A | 4/1997 | Arnold et al. |
| 5,637,469 A | 6/1997 | Wilding et al. |
| 5,654,497 A | 8/1997 | Hoffheins et al. |
| 5,677,195 A | 10/1997 | Winkler et al. |
| 5,677,196 A | 10/1997 | Herron et al. |
| 5,698,089 A | 12/1997 | Lewis et al. |
| 5,700,637 A | 12/1997 | Southern |
| 5,714,122 A | 2/1998 | Bretscher et al. |
| 5,726,435 A | 3/1998 | Hara et al. |
| 5,744,305 A | 4/1998 | Fodor et al. |
| 5,747,349 A | 5/1998 | Van Den Engh et al. |
| 5,748,091 A | 5/1998 | Kim |
| 5,755,942 A | 5/1998 | Zanzucchi et al. |
| 5,770,370 A | 6/1998 | Kumar |
| 5,773,307 A | 6/1998 | Colin et al. |
| 5,788,814 A | 8/1998 | Sun et al. |
| 5,814,524 A | 9/1998 | Walt et al. |
| 5,827,748 A | 10/1998 | Golden |
| 5,834,318 A | 11/1998 | Buettner |
| 5,837,552 A | 11/1998 | Cotton et al. |
| 5,840,256 A | 11/1998 | Demers et al. |
| 5,843,767 A | 12/1998 | Beattie |
| 5,846,708 A | 12/1998 | Hollis et al. |
| 5,854,684 A | 12/1998 | Stabile et al. |
| 5,856,174 A | 1/1999 | Lipshutz et al. |
| 5,858,804 A | 1/1999 | Zanzucchi et al. |
| 5,863,957 A | 1/1999 | Li et al. |
| 5,866,430 A | 2/1999 | Grow |
| 5,872,623 A | 2/1999 | Stabile et al. |
| 5,891,656 A | 4/1999 | Zarling et al. |
| 5,922,617 A | 7/1999 | Wang et al. |
| 5,942,443 A | 8/1999 | Parce et al. |
| 5,945,334 A | 8/1999 | Besemer et al. |
| 5,981,297 A | 11/1999 | Baselt |
| 6,013,440 A | 1/2000 | Lipshutz et al. |
| 6,023,540 A | 2/2000 | Walt et al. |
| 6,037,137 A | 3/2000 | Komoriya et al. |
| 6,048,732 A | 4/2000 | Anslyn et al. |
| 6,051,388 A | 4/2000 | Bodenhamer |
| 6,063,581 A | 5/2000 | Sundrehagen |
| 6,066,448 A | 5/2000 | Wohlstadter et al. |
| 6,074,616 A | 6/2000 | Buechler et al. |
| 6,083,761 A | 7/2000 | Kedar et al. |
| 6,103,479 A | 8/2000 | Taylor |
| 6,127,139 A | 10/2000 | Te Koppele et al. |
| 6,133,047 A | 10/2000 | Elaissari et al. |
| 6,168,948 B1 | 1/2001 | Anderson et al. |
| 6,171,780 B1 | 1/2001 | Pham et al. |
| 6,210,910 B1 | 4/2001 | Walt et al. |
| 6,232,066 B1 | 5/2001 | Felder et al. |
| 6,245,296 B1 | 6/2001 | Ligler et al. |
| 6,254,830 B1 | 7/2001 | Pivarnik et al. |
| 6,261,776 B1 | 7/2001 | Pirrung et al. |
| 6,288,220 B1 | 9/2001 | Kambara et al. |
| 6,291,183 B1 | 9/2001 | Pirrung et al. |
| 6,309,889 B1 | 10/2001 | Cutler et al. |
| 6,327,410 B1 | 12/2001 | Walt et al. |
| 6,331,441 B1 | 12/2001 | Balch et al. |
| 6,346,413 B1 | 2/2002 | Fodor et al. |
| 6,350,620 B2 | 2/2002 | Chang et al. |
| 6,379,969 B1 | 4/2002 | Mauze et al. |
| 6,399,365 B2 | 6/2002 | Besemer et al. |
| 6,610,482 B1 | 8/2003 | Fodor et al. |
| 6,649,403 B1 | 11/2003 | McDevitt et al. |
| 6,696,220 B2 | 2/2004 | Bailey et al. |
| 6,800,950 B2 | 10/2004 | Teshima et al. |
| 2001/0002984 A1 | 6/2001 | Vetter |
| 2001/0041341 A1* | 11/2001 | Besemer et al. ............... 435/6 |
| 2001/0055764 A1* | 12/2001 | Empedocles et al. ........... 435/6 |
| 2002/0025534 A1* | 2/2002 | Goh et al. ................... 435/7.1 |
| 2003/0003436 A1 | 1/2003 | Grant et al. |
| 2003/0008323 A1 | 1/2003 | Ravkin et al. |
| 2003/0049381 A1* | 3/2003 | Mirkin et al. ............... 427/402 |
| 2003/0077380 A1* | 4/2003 | Lefkowitz et al. ............ 427/2.1 |
| 2003/0157504 A1* | 8/2003 | Chee et al. ..................... 435/6 |

OTHER PUBLICATIONS

International Search Report for PCT/US04/15263 mailed Feb. 9, 2005.

Written Opinion for PCT/US04/15263 mailed Feb. 9, 2005.

U.S. Patent and Trademark Communication for U.S. Appl. No. 10/068,559 mailed May 4, 2005; 9 pages.

U.S. Appl. No. 10/832,469, filed Apr. 26, 2004, Schmid et al.

Stimpson, D. I. et al. "Real-time detection of DNA hybridization and melting on oligonucleotide arrays by using optical wave guides" Proc. Natl. Acad. Sci. USA 1995, 92, 6379-6383.

Heller, M. J. "DNA Microarray Technology: Devices, Systems, and Applications" Annu. Rev. Biomed. Eng. 2002. 4:129-153.

Warrington, J. A. et al. "New Developments in High-Throughput Resequencing and Variation Detection Using High Density Microarrays" Human Mutation 19:402-409, 2002.

Cutler, D. J. et al. "High-Throughput Variation Detection and Genotyping Using Microarrays" Genome Research 2001 11:1913-1925.

Southern, E. et al. "Molecular interactions on microarrays" Nature Genetics Supplement vol. 21 Jan. 1999.

Office Action for U.S. Appl. No. 10/068,559 mailed Mar. 10, 2004.

Office Action for U.S. Appl. No. 10/068,559 mailed Nov. 30, 2004.

International Search Report for PCT/US02/03595 mailed Sep. 11, 2002.

* cited by examiner

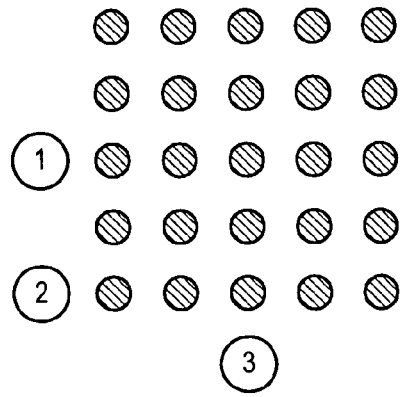
Fig. 7
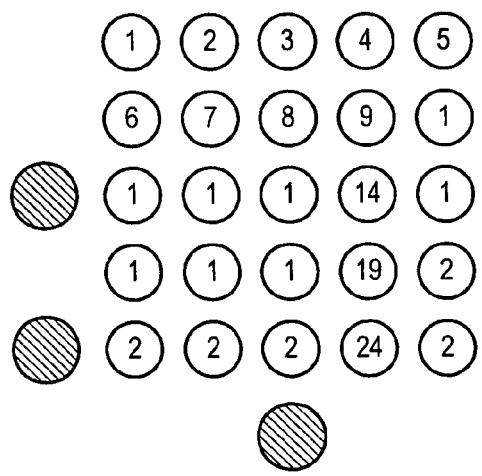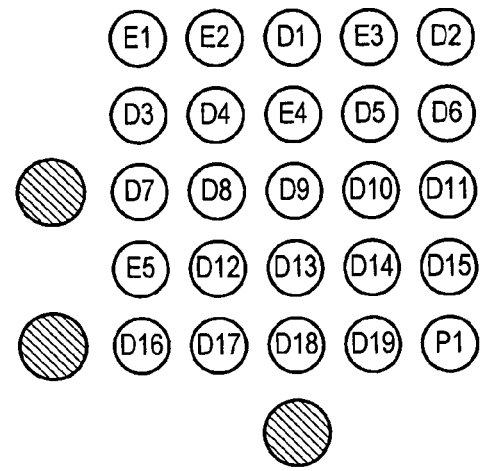
Fig. 8a　　　　　　　　　　　Fig. 8b

IMAGE AND PART RECOGNITION TECHNOLOGY

This application claims the benefit of U.S. Provisional Application No. 60/471,102 entitled "A NEW IMAGE AND PART RECOGNITION TECHNOLOGY," filed May 16, 2003.

BACKGROUND OF THE INVENTION

1. Field of the Invention

The present invention relates to a method of discriminating images. More particularly, the invention relates to a method of image and pattern recognition using a computer.

2. Description of the Relevant Art

Computerized identification systems are useful in a variety of applications. Products in a supermarket are branded with a barcode, the universal product code (UPC), that represents a ten digit number. A product UPC may identify the manufacturer and item number, which are correlated in a database to the product's price. Barcodes may be printed on a variety of surfaces and in a range of sizes. A laser scanning system is often used to recognize bar codes. Accurate readings may be obtained despite partial obscurement and nonuniform orientations. The barcode system is limited. The widths and spacing of a series of bars within a code represents a number. Thus, an accurate knowledge of the widths and spacing of the series of bars is crucial for accurate readings. As a barcode decreases in size, the bar widths and spaces can be obscured, because of resolution limitations.

Dot patterns may have advantages over barcode systems. FIG. 1 depicts a 5×5 dot pattern. Dots may be easier to make via photolithography, a process sometimes employed in making sensors. Additionally dots can be easily recognized in an image even if they are very small. Due to resolution limitations, as barcodes decrease in size accurate recognitions become more difficult. The dot pattern in FIG. 1 may not be a robust image identification system alone. The pattern can be rotated, flipped, and/or positioned upside-down. Patterns that are symmetric about a central axis may be misread if the pattern is rotated and/or mirrored.

FIG. 2 depicts two dot patterns with dots arranged in "M" and "W" formations with alignment markers positioned outside the patterns. Without the alignment markers, the patterns may become indistinguishable if one of the dot patterns is rotated 180 degrees. A similar situation arises if the dots in the pattern are arranged to resemble a "6" or a "9". Some identification systems position an additional dot or line as an alignment marker to facilitate identification of patterns.

FIG. 3 depicts dot patterns with a single central alignment mark and a secondary off-center alignment mark. Without secondary alignment marks, the patterns are indistinguishable if one of the dot patterns is mirrored. Failure of an image recognition system may occur if a pattern with a single central alignment dot is mirrored, particularly if an alignment mark is positioned along an axis of symmetry.

FIG. 4a depicts dot patterns that appear identical if the unfilled dots are ignored or not detectable when one pattern is rotated 180 degrees. Often only dots that produce a signal are detectable by a detector; and so when attempting to recognize a pattern, two patterns that may not appear identical if all dots are detectable will appear identical due to the detector used. In FIG. 4b, mirroring may cause two distinct patterns to resemble each other. The addition of a second alignment dot does not aid in distinguishing the rotated or mirrored pattern. While individuals may be able to distinguish between the rotated and mirrored patterns with two properly positioned alignment dots, a computer based recognition system may have difficulty with only two alignment marks. In a computer based recognition system, the alignment marks, may be identified first and then the dot patterns may be identified. This may be a source of some of the difficulty a computer-based system may encounter with only two alignment dots. While the angle of an array may be determined with two alignment dots, the mirroredness of an array can not be determined. The system may incorrectly identify patterns without information regarding the mirroredness of an image. Additionally, with only two alignment dots/markers, the identification systems must search a large area around the alignment markers to find the complete array.

SUMMARY OF THE INVENTION

Herein we describe systems and methods for recognizing images using alignment markers. The system and method of image recognition may be used with arrays, analyte arrays, biosensors, micro-fluidic arrays, and/or optical character recognition systems. The image recognized may be one or more patterns from an array, one or more characters, one or more numbers, one or more shapes, and/or one or more irregular shapes. Patterns may be printed or displayed on an object. Alternatively, a pattern may be generated by an array by a response of sensing elements in the array to an analyte in a fluid.

In one embodiment, an identification marking may be used to identify an object. Identification markings may be printed on the object, printed on packaging surrounding the object, or printed on a label attached to the object. In other embodiments, the identification marking may be formed as part of the object or embedded within the object. The identification marking may include an array of a plurality of elements. The elements may be arranged in a predetermined pattern that is unique for the object to which the identification marking is coupled.

During use, a detector may scan an identification marking. In many instances, the identification marking may be in a random orientation with respect to the detector. Thus, an array displayed on the identification marking may be rotated or otherwise disoriented with respect to the detector. Generally, in order to determine the pattern a detector calculates the proper orientation of the array before analyzing the pattern. In one embodiment, three or more alignment markers are positioned proximate to the array. The alignment markers are positioned such that the orientation of the array may be determined based on the position of the alignment markers.

Identification of the alignment markers may be facilitated by designing alignment marks that have a detectable property that is different from the elements of the array. In one embodiment, the alignment markers may have a shape and/or size that is different from the shape and/or size of the elements. Additionally, each of the alignment markers may be differentiated from the other alignment markers by shape and/or size. The shape and/or size of the alignment markers may be used to determine information regarding the array. For example, the alignment markers may have a size that is a function of, but not equal to, the size of the elements. By determining the size of the alignment markers, the size of the sensing elements may be determined. In another embodiment, the distance between the alignment markers may be used to determine information regarding the array. In one embodiment, the distance between two of the alignment markers may be a function of the size of the elements and/or the distance between the elements. In an embodiment, one or more alignment markers may be used to indicate a center of the array. In one embodiment, alignment markers may be positioned along adjacent edges of an array.

The elements may be arranged in a pattern that may be used to identify an object. For example, the elements may be arranged in the form of an alphanumeric character. The elements may be oriented in positions of an imaginary array. For example, one or more alphanumeric characters may be formed using an array of elements as a template. During use, only the elements that are needed to form the alphanumeric characters may be visible to a detector, the unused positions within the array being non-visible. Typical dot matrix type representations of alphanumeric characters are well known and may be used to form patterns in on an array template.

The determination of patterns accurately may be influenced by the readability of the elements. If one or more of the, elements is not properly read, or is in some way disfigured to render the element unreadable, the pattern may be incorrectly identified. In one embodiment, on or more error checking elements may be placed within the array. The error checking elements may be used to monitor the readability of the elements. For example, if one or more of the error checking elements is not correctly read, then the detector may reject the identification marking and signal that the identification marking is not readable.

A method of using the identification marking to identify an object includes passing the object by a detector such that the detector can scan the identification marking. The identification marking includes an array of a plurality of elements. Three or more alignment markers may be positioned proximate to the array. After the identification marking is scanned, the detector determines the identity and position of each of the alignment markers. The properties of the alignment markers may be used to identify properties of the array such as, but not limited to, the size of the array, the size of the elements, the spacing of the elements within the array, and the center of the array. This information may be used to determine the pattern on the identification marking and thus the identity of the object.

The alignment markers may be used to determine a number of properties of the array. For example, the array may be rotated with respect to the detector coordinate system. The alignment markers may be used to determine the rotation of the array with respect to the detector coordinate system. Additionally, the array may be mirrored. For example, if the identification marker is substantially transparent, the elements may be detected from either a front side or a back side. If the image is properly viewed from the front side, analyzing the back side of the array may give a pattern that is a mirror image of the proper pattern. The alignment markers may be used to determine if the detector has captured a mirrored image of the array. After the pattern is properly oriented, the pattern may be detected and identified by comparing the pattern to a database of predefined patterns.

In addition to identification of objects, a similar system and method may be used to identify analytes in a fluid. In one embodiment, a sensor array may be used to identify one or more analytes in a fluid. Analytes generally includes any chemical that is carried by or dissolved in a fluid. The sensor array may include an array of a plurality of sensing elements. One or more sensing elements may be configured to produce a detectable signal in the presence of an analyte.

During use, a sensor array may be contacted with a fluid containing one or more analytes. A detector may scan the sensor array. In one embodiment, three or more alignment markers are positioned proximate to the sensor array. The alignment markers are positioned such that the orientation of the sensor array may be determined based on the position of the alignment markers. As described above, many properties of the sensor array may be determined by analysis of the alignment markers. The identity of the analyte may be determined based on the pattern of sensing elements that produce a detectable signal.

BRIEF DESCRIPTION OF THE DRAWINGS

Other objects and advantages of the invention may become apparent upon reading the following detailed description and upon reference to the accompanying drawings in which:

FIG. 7 depicts an embodiment of an array including three alignment markers.

FIG. 8a depicts an embodiment of a dot array that is numbered for use with Hamming Code error checking.

FIG. 8b depicts an embodiment of a Hamming coded dot array.

Figure 1:
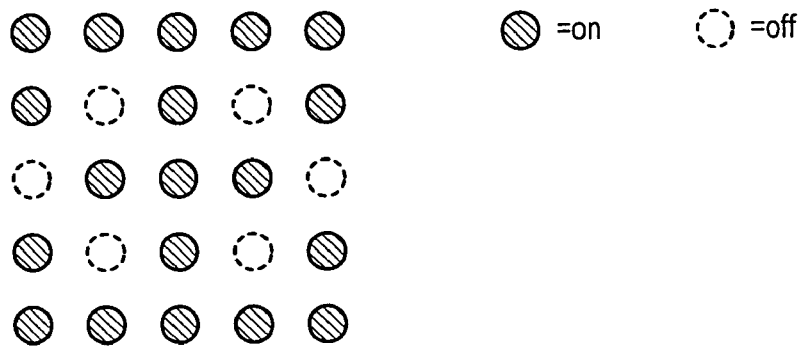
FIG. 1 depicts an embodiment of a dot array.
Figure 2:
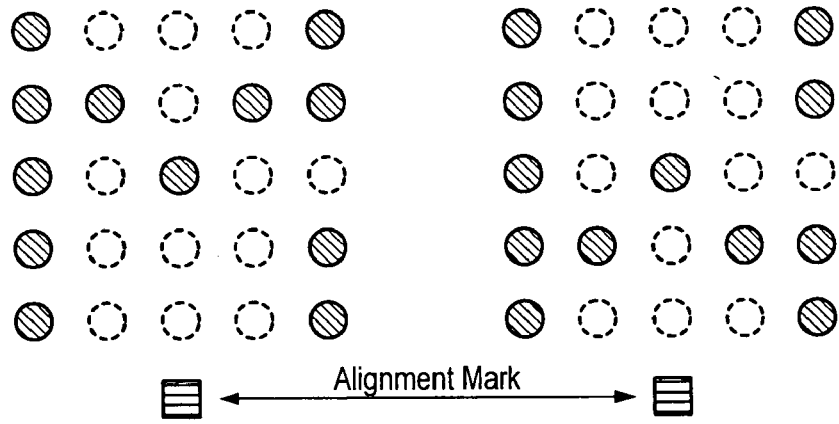
FIG. 2 depicts an embodiment of dot arrays that are indistinguishable upon rotation.
Figure 3:
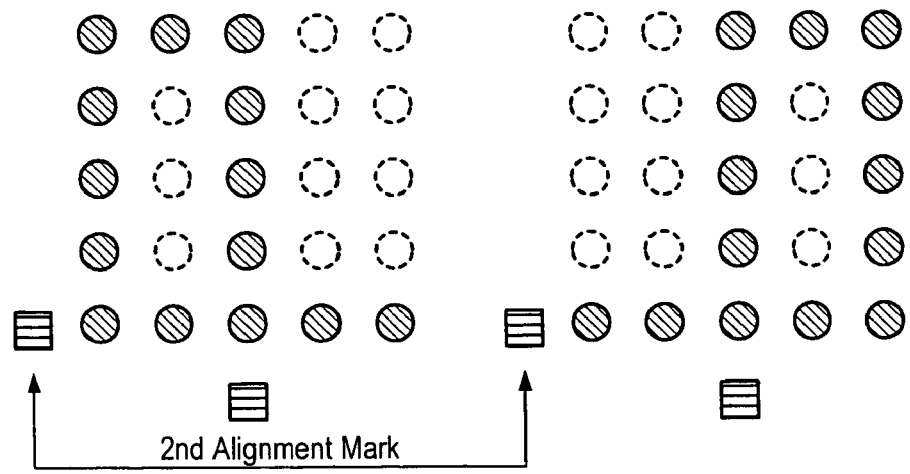
FIG. 3 depicts an embodiment of dot arrays that are indistinguishable when mirrored.
Figure 4A:
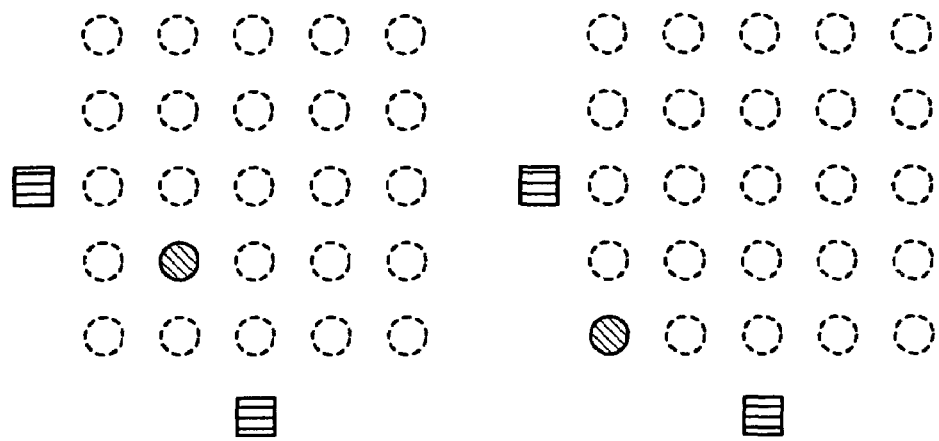
FIG. 4a depicts an embodiment of unique arrays that appear indistinguishable when one array is rotated.
Figure 4B:
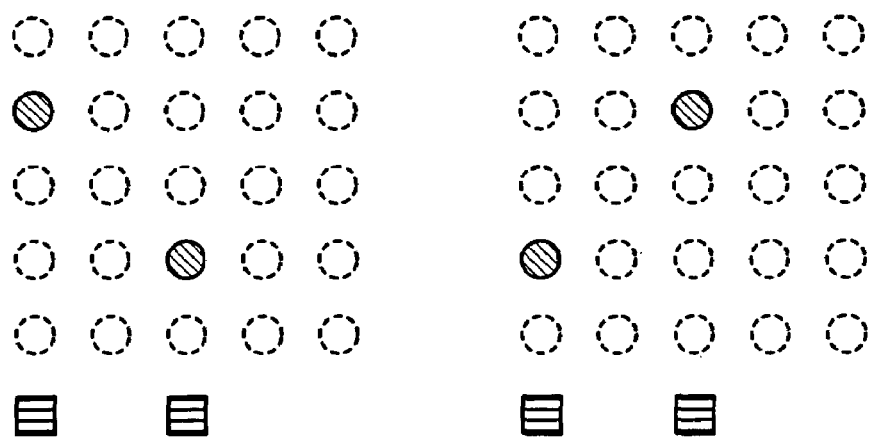
FIG. 4b depicts an embodiment of unique arrays that appear indistinguishable when one array is mirrored.

While the invention is susceptible to various modifications and alternative forms, specific embodiments thereof are shown by way of example in the drawings and may herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Herein we describe a system and method for the identification of patterns. The system and method may discriminate between patterns that may be generated. The system may include identification markings and/or sensor arrays. Patterns of elements in an array of an identification marking and/or a sensor array may facilitate identification of items and/or analytes.

In an embodiment, alignment markers may be positioned proximate an array of elements. An array may include, but is not limited to an identification marking and/or sensor array. An array of elements may be used to create a unique identification code. The unique identification code, or identification marking, may be used to identify an object or a condition. Alignment markers may be distinguishable from elements in a sensor array and/or identification marking. Alignment markers may be distinguishable from other alignment markers. Three or more alignment markers may be positioned proximate a pattern. Two alignment markers may be positioned on a first edge of a pattern. A third alignment marker may be positioned on an edge adjacent to the first edge of a pattern. Alignment markers may be positioned such that rotation and/or mirroredness of a pattern may be determined.

In some embodiments, first alignment markers are identified. A rotation and mirroredness of a pattern may then be determined from characteristics of alignment markers. Incorporating the rotation and mirroredness information may aid accurate identification of the pattern.

The systems and methods may include identifying an identification marking. An identification marking may be used to identify an object or a condition. An identification marking may be placed on an item. An identification marking may be used to identify a condition including, but not limited to, a chemical present, and/or electrical state. An item may include, but is not limited to any object, such as an item in a store, a piece of paper, and/or a shipping box. In some embodiments, an identification marking may include an array of elements and three or more alignment markers. The orientation of the array may be determined by the position of one or more alignment markers. Alignment markers may be positioned to facilitate determination of the orientation of the array. Alignment markers may have a shape, size, and/or color related to information about the elements in the array, such as the number of elements in the array and/or the size of the array. Each alignment marker may provide information related to the array of elements. In an embodiment, a relationship between two or more alignment markers may provide information about the array. Information about the array may include the number of elements in the array, the size of the array, the distance between elements in the array, the center of the array, and/or edges of the array.

Elements may be positioned in a predetermined pattern. The predetermined pattern may include one or more alphanumeric characters. Elements may have a predetermined shape and/or size. Elements may be substantially circular, substantially oval, substantially square, substantially rectangular, or irregularly shaped. In certain embodiments, elements may include a plurality of dots, lines, letters, numbers, and/or other shapes. Elements may be lines of varying widths.

In one embodiment, a shape of an element may be different from a shape of one or more alignment markers. In an embodiment, shapes of all of the elements may be different from shapes of all the alignment markers. The size, shape, and/or color of an element may be different from the size of an alignment marker. Elements and alignment markers may be similar. Elements and alignment markers may be distinguishable. Alignment markers may be approximately two times the size of an element.

In certain embodiments, elements in an identification marking may include one or more error checking elements. In an embodiment, error checking elements may be used to determine whether errors occurred when the elements are read.

In some embodiments, an item may include an identification marking. During use, a detector may scan an identification marking. In many instances, the identification marking may be in a random orientation with respect to the detector. Thus, an array displayed on the identification marking may be rotated or otherwise disoriented with respect to the detector. Generally, in order to determine the pattern, a detector calculates the proper orientation of the array before analyzing the pattern. A detector may detect the size and/or position of alignment markers and/or elements to facilitate a proper orientation of the array. A detector may recognize the identification marking on an item. A detector may recognize the identification marking on an item and recall information associated with the item, such as price, inventory size, and/or related items.

In some embodiments, detecting an identification marking may include scanning an identification marking, identifying the three or more alignment markers proximate an array of elements in the identification marking, determining the position of one or more elements, determining properties of the array, and/or determining the predetermined pattern. In an embodiment, identifying three or more alignment markers may include determining a distance from one alignment marker to other alignment markers. Distances between alignment markers may be compared to predetermined possible distances.

Determining properties of the array may be based on identified alignment markers. In an embodiment, a property of the array may include the center of the array. A center of the array may be determined from a first and a second alignment marker. Other properties of the array may include mirroredness and/or rotation.

Mirroredness may be determined from a position of one or more alignment markers. Relative positions of alignment markers may determine properties of an array. In an embodiment determining the mirroredness of an array may include determining the position of at least three alignment markers, determining an angle between a first and a second alignment marker, determining an angle between a first and third alignment marker, and/or comparing the angle between the first and second alignment marker to the angle between the first and third alignment marker. Angles may be measured on a Cartesian coordinate system. A first alignment marker may be positioned at the origin of a Cartesian coordinate system for angle measurements.

Determining the rotation of an array may include first identifying positions of at least two alignment markers. An angle between two alignment markers may be determined, where one of the alignment markers is positioned at the origin of a Cartesian coordinate system.

Elements in an array may form a pattern. A pattern may include, but is not limited to, a character, a word, a number, a pattern or dots, and/or a pattern of lines. Determining a predetermined pattern may include comparing a pattern of the element in the array to a database of known patterns. Alignment markers and/or elements may facilitate determining the predetermined pattern.

In certain embodiments, an identification marking may include a plurality of alphanumeric characters. Alphanumeric characters may include dots and/or lines (such as produced by an ink-jet printer). Alphanumeric characters, alternatively, may be formed by a laser printer. Three or more alignment markers may be positioned proximate a grouping of alphanumeric characters and/or each of the alphanumeric characters. In an embodiment, a group of alphanumeric characters less than the total number of alphanumeric characters may be associated with three or more alignment markers. Alignment markers may facilitate identification of array properties such as rotation, mirroredness, array size, array shape, element size, total number of elements in the array, and/or a center of an array.

Recognizing identification markings may be useful in item recognition. For example, a product in a grocery store may have a brand name and a product name on the product packaging. The brand name and/or product name may be an identification marking. Alignment markers may be positioned proximate the brand name and/or product name to facilitate identification of the product. A database may include pricing and/or inventory information about the product. When a consumer purchases the product, the product may be identified by the identification marking and a database may be used to obtain pricing and/or inventory information about the product.

The system and method of recognizing identification markings may be performed by a computer system. In one embodiment, a system and method for image recognition may include program instructions executable by a CPU in a computer system. A system may include a carrier medium with program instructions for image recognition. A computer or computer system may typically include components such as CPU with an associated memory such as floppy disks and/or CD-ROMs. Memory may store program instructions for computer programs. Program instructions may be executable by CPU. The term "memory" is intended to include any installation medium, e.g., a CD-ROM or floppy disks, a computer system memory such as DRAM, SRAM, EDO RAM, Rambus RAM, etc., or any non-volatile memory such as a magnetic media, e.g., a hard drive or optical storage. Memory may also include other types of memory or combinations thereof. In certain embodiments, a system and method for image recognition may include a carrier medium with program instructions.

The system and method may include identifying analytes using a sensor array. The system may identify an analyte. The system may discriminate between patterns generated by a sensor array. A pattern may be associated with an analyte. The sensor array may include sensing elements and alignment markers. The alignment markers may be associated with the orientation of the sensor array. The sensing elements may produce a signal in the presence of an analyte. An aspect of the system is that the array may be formed using a microfabrication process, thus allowing the system to be manufactured in an inexpensive manner.

The system may identify the orientation of a sensor array from alignment markers. The system may determine the pattern generated from the sensor elements. The system may determine the analyte associated with the pattern by using information about the orientation of the pattern. The system may determine the identity of an analyte present in the array by recognizing the pattern of sensing elements in the array.

In some embodiments, a sensor array may detect analytes. A sensor array may include an array of sensing elements and three or more alignment markers. Sensing elements may produce a detectable signal in the presence of an analyte. Alignment markers may be positioned proximate the array. Alignment markers may be formed on a support member of a sensor array. Alignment markers may be positioned to facilitate determination of the orientation of the array. Alignment markers may have a shape, size, and/or color related to information about the elements in the array, such as the number of elements in the array and/or the size of the array. Each alignment marker may provide information related to the array of elements. In an embodiment, a relationship between two or more alignment markers may provide information about the array. Information about the array may include the number of elements in the array, the size of the array, the distance between elements in the array, the center of the array, and/or edges of the array.

The system may include sensing elements as described in U.S. Patent Application No. 2003-0003436 A1, "Use of Mesoscale Self-Assembly and Recognition to Effect Delivery of Sensing Reagent for Arrayed Sensors," to Willson et al. published on Jan. 2, 2003, which is incorporated herein by reference. The sensing elements may be arranged in an array.

The array, in some embodiments, is made of a plurality of different sensing elements disposed within a supporting member. Each of the different sensing elements may have a shape and/or a size that differs from the shape and/or size of the other sensing elements. The shape and/or size of the sensing element may be associated with a specific analyte or combination of analytes. Thus, the presence of a particular analyte may be determined by the observance of a signal from a sensing element having a predetermined shape and/or size. This offers an advantage over conventional systems, where the location of the particle, rather than the shape and/or size of the particle, determines the identity of the analyte.

In some embodiments the array is a microfluidic array. The sensing element of the microfluidic array may be a cavity. In some embodiments, the sensing element may be one or more particles positioned in a cavity in the microfluidic array. The particle may generate a signal in the presence of an analyte. Signals generated by particles may form a pattern. A pattern may be associated with an analyte. The microfluidic array may include a plurality of cavities. A particle may be loaded in a cavity of the microfluidic array by pipette. More than one particle may be loaded into each cavity of the microfluidic array. Examples of particle based analyte detection systems that may incorporated the method of image recognition described herein are described in U.S. Pat. No. 6,649,403 entitled "Method of Preparing a Sensor Array" to McDevitt et al., which is incorporated herein by reference.

An array may be a plurality of regions of support. In certain embodiments, the array may be a support member in which sensing elements are positions on the support member where a receptor is positioned or coupled. An inkjet delivery system may deposit nanoliter and/or picoliter volumes onto specific positions on the array. In an embodiment, the specific positions on the array may be charged surfaces that inhibit movement of the deposited volumes.

In some embodiments, the sensing elements in an array may be arranged in a pattern of dots. The sensing elements may produce a signal in the presence of an analyte. Specific patterns of dots may be associated with a specific analyte.

A sensor array may include sensing elements and alignment markers. Sensing elements may be a variety of shapes, sizes, and/or colors. Sensing element may have a predetermined shape. Sensing elements may have a different shape than alignment markers. Sensing elements may be substantially circular, substantially oval, substantially square, substantially rectangular, or irregularly shaped. Sensing elements may be shaped as a letter and/or a number. Sensing elements may be lines of varying widths.

In an embodiment, sensing elements possess the ability to bind an analyte of interest and/or to create a signal. A sensor array may be useful for biosensor identification. A sensing element may include a probe for detecting a complementary nucleic acid. A sensing element may include one or more receptor molecules which posses the ability to bind an analyte of interest and to create a signal. In an embodiment, a receptor molecule may be capable of binding with more than one analyte. A receptor may be included in a sensing element due to its interaction with an analyte. In some embodiments, a sensing element may include one or more receptor molecules and one or more indicators. A receptor molecule may be able to bind to an analyte of interest. Upon binding with an analyte of interest, a receptor molecule may cause the indicator molecule to produce a signal.

A receptor may be loaded onto a sensing element. A receptor may be coupled to a sensing element. A receptor may be configured to produce a signal in the presence of one or more analytes. Receptor molecules may include naturally occurring or synthetic receptors formed by rational design or combinatorial methods. Natural receptors include, but are not limited to, DNA (single or double stranded), RNA, proteins, enzymes, oligopeptides, antigens, organic molecules and/or antibodies.

In some embodiments, a platform-independent probe loading methodology ("multiplexing") may be used to load receptors on sensing elements, as described in U.S. patent application Ser. No. 10/832,469 to Schmid et al., entitled "SYSTEM AND METHOD FOR THE DETECTION OF ANALYTES" filed on Apr. 26,2004, which is fully incorporated herein by reference as if set forth herein. Multiplexing may increase the array's density not by adding features to the array, but rather by increasing the array's density by increasing the number of probes that may be distributed within the array's original number (quantity) of features. Feature-multiplexing breaks from the status quo of placing each probe on its own exclusive sensing element in order to index the array. Feature-multiplexing indexes an array by placing a probe at a unique combination of sensing elements. Using this methodology, a given number of (n) of sensing elements may be used to deploy a much greater quantity (up to 2n-2) of probes. Because there is this exponential relationship between the number sensing elements and the number of probes an array may accommodate, this methodology can dramatically augment the number of analytes an array may be used to detect. In some embodiments, multiplexing may be enhanced by use of a parity-sensing element, which may help identify the specific analyte that is interacting with one or more sensing elements when multiple analytes may have a similar code.

In some embodiments, one or more probes may be loaded onto one or more sensing elements. Each individual sensing element may have a unique loading of one or more probes. The combination of the individual sensing elements may represent an encoding sequence of one or more analytes. The combination of sensing elements may produce a signal that may be interpreted as a code or pattern. The code or pattern, represented by the sensing elements, may be used to identify the particular analyte or analytes that are present. Multiplexing may decrease the number of experiments a researcher would need to perform in order to screen for the presence of a large set (greater than the current capacity of existing arrays) of analytes. Fewer experiments equate to preparing fewer samples and using fewer detection devices, and both of these outcomes are favorable to the industry.

A detector may facilitate identification of an analyte, alignment markers, and/or sensing elements. During use, a detector may scan an array. In many instances, the array may be in a random orientation with respect to the detector. Thus, a detector may rotate or otherwise oriented the array with respect to the detector. Generally, in order to determine the pattern a detector calculates the proper orientation of the array before analyzing the pattern. A detector may detect the size and/or position of alignment markers and/or elements to facilitate a proper orientation of the array. A detector may detect and/or identify the alignment markers and/or sensing elements. A detector may be coupled to a processor. A detector may use detected alignment markers and/or sensing elements to identify an analyte present in the sensor array.

In some embodiments, detecting an analyte may include, passing a fluid over a sensor array, scanning the sensor array, identifying alignment markers, determining properties of the array, and/or determining the predetermined pattern. As the fluid passes over the sensor array, one or more sensing elements may produce a signal. In an embodiment, sensing elements that interact with the analyte in the fluid may produce a detectable signal. Identifying alignment markers may include determining the position of alignment markers and sensing elements and then identifying the alignment markers. In an embodiment, may include determining a distance from one alignment marker to other alignment markers. Distances between alignment markers may be compared to predetermined possible distances.

Determining properties of the array may be based on identified alignment markers. In an embodiment, a property of the array may include the center of the array. A center of the array may be determined from a first and a second alignment marker. Properties of the array may include mirroredness and/or rotation.

Mirroredness may be determined from a position of one or more alignment markers. Relative positions of alignment markers may determine properties of an array. In an embodiment determining the mirroredness of an array may include determining the position of at least three alignment markers, determining an angle between a first and a second alignment marker, determining an angle between a first and third alignment marker, and/or comparing the angle between the first and second alignment marker to the angle between the first and third alignment marker. Angles may be measured on a Cartesian coordinate system. A first alignment marker may be positioned at the origin of a Cartesian coordinate system for angle measurements.

Determining the rotation of an array may include first identifying positions of at least two alignment markers. An angle between two alignment markers may be determined, where one of the alignment markers is positioned at the origin of a Cartesian coordinate system.

Sensing elements may produce a detectable signal in the presence of an analyte. A pattern may be generated by the sensing elements that produce a signal due to the presence and/or absence of an analyte. Determining a predetermined pattern may include comparing a pattern of the element in the array to a database of known patterns. Alignment markers and/or elements may facilitate determining the predetermined pattern. A pattern may be generated by sensing elements in a sensor array.

The system and method of image recognition may be performed by a computer system. In one embodiment, a system and method for image recognition may include program instructions executable by a CPU in a computer system. A system may include a carrier medium with program instructions for image recognition. A computer or computer system may typically include components such as CPU with an associated memory such as floppy disks and/or CD-ROMs. Memory may store program instructions for computer programs. Program instructions may be executable by CPU. The term "memory" is intended to include any installation medium, e.g., a CD-ROM or floppy disks, a computer system memory such as DRAM, SRAM, EDO RAM, Rambus RAM, etc., or any non-volatile memory such as a magnetic media, e.g., a hard drive or optical storage. Memory may also include other types of memory or combinations thereof. In certain embodiments, a system and method for image recognition may include a carrier medium with program instructions.

Arrays may include elements and alignment markers. Arrays may include, but are not limited to, identification markings and/or sensor arrays. Elements may include elements in an array of an identification marking and/or sensing elements in a sensor array. Alignment markers may be similar to elements in an element array of an identification marking. Alignment markers may be similar to sensing elements of a sensor array. An alignment marker may indicate the rotation and/or mirroredness of an array. Alignment markers may be positioned proximate an array. Alignment markers may facilitate identification of patterns generated by an array. In some embodiments, alignment markers may provide orientation information to the analyte identification system to facilitate accurate identification of an analyte. In an embodiment, alignment markers may reduce inaccurate identifications due to the orientation of a pattern relative to a detector.

In some embodiments, three or more alignment markers may be positioned proximate an array. In an embodiment, utilizing three or more alignment markers may facilitate recognition of the angle, mirroredness, and position of an array. The use of three or more alignment markers may facilitate accurate recognition of array patterns. An array pattern may include but is not limited to a pattern formed by elements in an identification marking and/or a pattern generated by sensing elements in a sensor array. The alignment markers each may be substantially circular, substantially square, substantially oval, substantially rectangular, and/or irregularly shaped. In some embodiments, the alignment markers may have a shape that differs from the shape of another alignment marker. Alignment markers may have substantially similar shapes. Substantially circular alignment markers may be easier to identify by a computer. The circular alignment marker may be a dot. A dot may facilitate computer recognition because a dot appears the same regardless of rotation and/or mirroredness. A dot may be an easy shape to form using photolithography. In an embodiment, alignment markers may have similar sizes. Alignment markers with similar sizes may be more easily recognized.

Alignment markers and elements may have similar sizes. Alignment markers and elements may have substantially different sizes. In some embodiments, alignment markers may be larger in size than elements. In an embodiment, an alignment marker may be approximately two times the size of an element. Using substantially different sized alignment markers and elements may have advantages compared to similarly sized alignment markers and elements. When an alignment marker is larger than an element, distinguishing alignment markers from elements may be facilitated. In some embodiments, the image recognition system may identify alignment markers before identifying the elements. In some embodiments, a computer may be utilized to recognize differences in sizes. In an embodiment, the center position of a large shape is more readily determined than in a small shape. Identification of a center position of an alignment marker may facilitate accurate array angle determinations.

In certain embodiments, the size of the alignment marker may convey information about the array. For example, an array designed to identify a group of analytes may include an alignment marker of a predetermined size. A fluid may pass over several sensor arrays. Analytes in the fluid may couple with one or more sensing elements. An analyte may be detected by recognizing the patterns of the sensor arrays and/or sizes of alignment markers on the sensor arrays. In an embodiment, a size of an alignment marker may indicate a group with which an item is associated. Identification of a group an item is associated with may facilitate location of information associated with an item in a database (i.e., a price of an item, other colors of an item available).

In one embodiment, the size of an alignment marker may indicate the size of an element. In an embodiment, an alignment marker may be twice the size of an element in an array. Knowledge of relative sizes of alignment markers and elements may facilitate identification of alignment markers. Size information may distinguish between alignment markers and elements, facilitating accurate identification of array patterns.

In some embodiments, the system may include identifying alignment markers prior to identifying elements. Information about the relative sizes of the alignment markers and elements may narrow searches for elements to objects in a determined size range. In an embodiment, alignment marker and element size ranges may be input into a computer executing the image recognition method. Alignment markers may be configured to reveal the size range of elements (i.e., a size and/or a shape of an alignment marker may indicate the size range of elements associated with the alignment marker).

The size of an alignment marker may indicate the number of elements in an array. In some embodiments, a larger alignment marker may indicate a greater number of elements in an array. In some embodiments, at least one alignment marker may indicate the number of elements in the array. In some embodiments, each alignment marker may provide different information about the array. In some embodiments, a combination of alignment markers may provide information about the array to facilitate identification of a pattern. Similarly, shape, color, and/or relative positions may indicate information about the array or information about elements in the array.

The position of the alignment markers may convey information about an array. In some embodiments, a distance between a first alignment marker and a second alignment marker may be approximately twice the distance between two adjacent elements in the array. In an embodiment, a distance between a first alignment marker and a third alignment marker may indicate the location of the center of an array. In an embodiment, a distance between an alignment marker and the array may be approximately equal to a diameter of an element.

The positioning of alignment markers may identify one or more edges of the array. In an embodiment, alignment markers may identify a first edge and a second edge substantially perpendicular to the first edge. Two or more alignment markers may be positioned proximate a first edge of an array and one or more alignment markers may be positioned proximate a second edge of the array. The size of an alignment marker may indicate the size of an array.

The system may search an area proximate the alignment markers for elements and/or signals generated by elements. Limiting the area of search may speed up image recognition and/or reduce erroneous readings caused by misidentified elements. Information obtained from the alignment markers may limit a search area for elements in the array. In an embodiment, information obtained from the alignment markers may define the search area for the elements in the array.

When center point, bottom and left edge locations of an array are determined, the size of the array may be determined. Knowledge of the size of the array may restrict the search area for pattern to accurately identify the size of a pattern. When alignment markers are configured to provide information about center point, bottom, and left edge locations, an array may have various shapes. In some embodiments, an array may be substantially square, substantially rectangular, substantially triangular, and/or substantially circular.

Proper positioning of alignment markers may be determined using a test. The test may ensure that when a rotated and/or mirrored first array is positioned over a second array such that alignment marks from the first and second array overlap, the regions occupied by the elements of the first and second array do not overlap. In some embodiments, alignment markers in different arrays do not have substantially similar shapes. The dot array regions may overlap when the alignment markers do not have substantially similar shapes.

Figure 5:
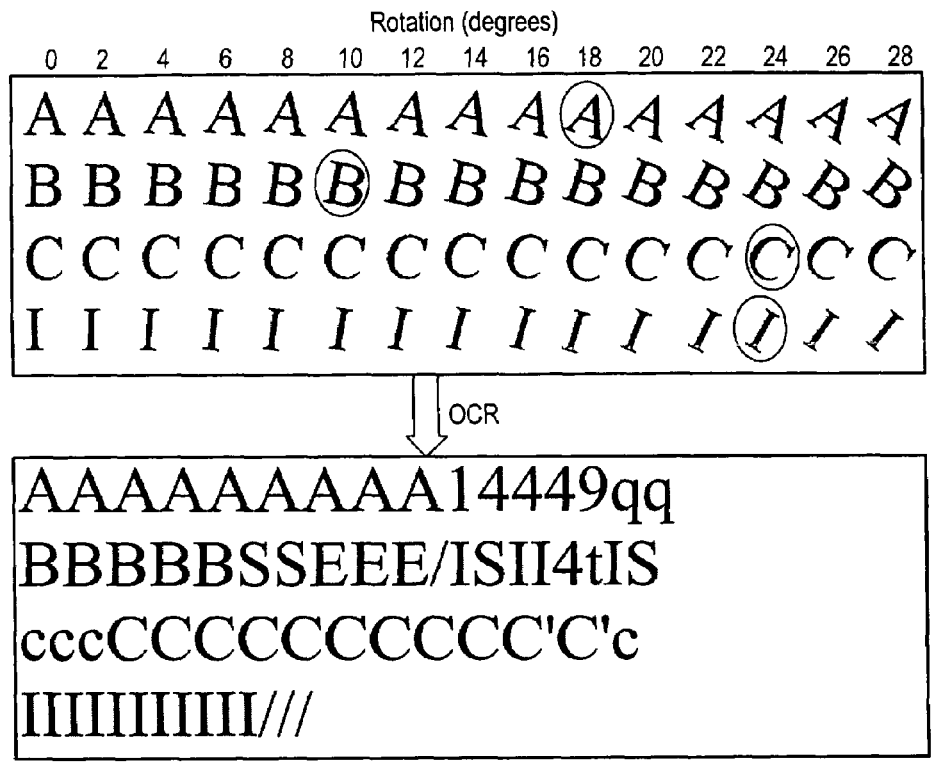
FIG. 5 depicts an embodiment of computer based identification misreading.

The use of three or more alignment markers proximate an array may be extended to other recognition applications. For example, the system can be used to assist pattern recognition software, such as optical character recognition (OCR) applications. OCR techniques are very good at identifying letters and numbers with varying sizes and fonts. OCR techniques have relatively high defect tolerance and imperfect characters may often be correctly detected. OCR is designed to recognize characters in a line of text, (e.g., characters that are all perfectly upright). If the characters are rotated even a small amount, recognition may fail (see FIG. 5). Thus, current OCR techniques may not be useful for applications where letters or patterns are at varying angles (for example, alphabet soup).

The system may be utilized with OCR techniques. In some embodiments, alignment markers may be placed proximate a character. Three or more alignment markers may be placed around a single character or a group of characters. Alignment markers may be used to determine the rotation and mirroredness of the character. Then, the character may be redrawn in an upright and un-mirrored fashion and fed into an OCR program for recognition. In this way, the advantages of OCR, such as font size, type independence, and defect tolerance, may be utilized.

The system may take a digital image of an array pattern and determine the pattern regardless of orientation and/or mirroredness. The system may be two-fold. The system may first extract location and sizes of the alignment markers in the array system. In some embodiments, the system may first use machine vision techniques and algorithms to extract the locations and sizes of the alignment markers and elements in the image. In some embodiments, alignment markers and elements may be similar in size, shape, and/or color. In some embodiments, the alignment markers may differ from the elements in size, shape, and/or color. The system may use size and location information from alignment markers and accurately determine a pattern.

Several techniques to extract size and location information of elements such as dot shaped elements in an image are generally known in the art. Some techniques are faster and/or more robust than other techniques. The system may include computer techniques to extract size and location information of elements in an array.

In some embodiments, a list of components may be obtained from an image of the array pattern and/or the array pattern itself. The list of components may include alignment markers and elements. The alignment markers may be differentiated from the elements in the list of components.

In certain embodiments, the size of an alignment marker may be different from the size of an element. In some embodiments, the size of one alignment marker may be different from the size of a different alignment marker for the same array. Alignment markers associated with an array may have similar sizes and/or shapes. Alignment markers associated with several arrays may have similar sizes and/or shapes. In some embodiments, the size of an alignment marker may correspond to an array. If the size of alignment markers is specified, then alignment markers may be identified from the list of components based on size. In some embodiments, the size of an alignment marker may be in a specified range. In some embodiments, the sizes of alignment markers may be in a specified range among several ranges associated with alignment markers for arrays.

In some embodiments, a range containing the specified size of an alignment marker may be utilized to search the list of components. In some embodiments, the alignment markers may be approximately 50 pixels. A component list may be searched for alignment markers that have sizes in the range of approximately 45 pixels to approximately 55 pixels.

In some embodiments, a size of an alignment marker may not be previously specified. The size of an alignment marker may differ from the size of an element. An alignment marker may be larger than an element. Alternatively, an alignment marker may be smaller than an element. A histogram of diameters for the items in the list of components may be constructed to facilitate identification of alignment markers. The histogram may have peaks associated with sizes of alignment markers and/or elements. In some embodiments, the histogram may have two peaks where one peak may be associated with the size of the alignment markers and the second peak may be associated with the size of the elements. Alignment markers may be identified within the list of components based on the size determined from the histogram. A range may be used to identify alignment elements in the list of components to decrease the effects of noise, debris, and/or defects in alignment marker production.

In some embodiments, the size of an alignment marker may be input into the system to identify alignment markers. In an embodiment, three or more of the largest items, with respect to size, in the list of components are averaged. The averaged size may correspond to a size of alignment markers. In some embodiments, a tolerance is used with the averaged size to obtain a range. The list of components may be searched for alignment markers by identifying items in the list of components within the range of sizes.

In some embodiments, a predetermined number of alignment markers may be identified with an array. An array may be associated with three alignment markers. Once alignment markers have been identified, groups of three alignment markers may be found. In some embodiments, more than three alignment markers may be associated with an array. The alignment marker diameter may be related to the distance between alignment markers. The distance between the alignment markers may be calculated from the alignment marker diameter $D_L$:

Distance between alignment markers 1 and 2: $d_{12}=2 \times D_L$

Distance between alignment markers 1 and 3: $d_{13}=3.25 \times D_L \times \sqrt{2}$ Distance between alignment markers 2 and 3: $d_{23}=\sqrt{(3.25 D_L)^2 + (1.25 D_L)^2}$ where $d_{12}$, $d_{13}$, and $d_{23}$ are center-to-center distances between alignment markers.

A method may be used to identify groups of alignment markers associated with an array. First, an alignment marker may be selected and the selected dot may be called the "current dot". Next, distances between the current dot and all other alignment markers may be calculated and stored. If two of the calculated distances are $d_{12}$ and $d_{13}$ then the current dot might be alignment marker 1. Then, the distance between alignment markers 2 and 3 may be calculated. If the distance is equal to $d_{23}$, then a group of alignment markers associated with an array may have been found.

In some embodiments, after the distances between the current dot and the alignment markers are calculated, two of the calculated distances may be $d_{12}$ and $d_{23}$ such that the current dot may be alignment marker 2. Then, the distance between alignment markers 1 and 3 may be calculated. If the distance is equal to $d_{13}$, then a group of alignment markers associated with an array may have been found.

In certain embodiments, after the distances between the current dot and the alignment markers are calculated, two of the calculated distances may be $d_{13}$ and $d_{23}$ such that the current dot may be alignment marker 3. Then, the distance between alignment markers 1 and 2 may be calculated. If the distance is equal to $d_{12}$, then a group of alignment markers associated with an array may have been found. In some embodiments, once an alignment marker is associated with a group of alignment markers it is not considered in determining groups of alignment markers. The use of a current dot and calculated distances may identify the groups of associated alignment markers from a list of components.

Distance calculations may be calculated accounting for tolerance ranges. In some embodiments, a tolerance range may be ±10%. A tolerance range that is too large may cause ranges for distances between alignment markers to overlap. Overlapping alignment marker distances may cause inaccurate determinations of orientations of arrays.

Once alignment dots have been grouped, the rotation and the mirroredness of an array may be determined. An embodiment of the method to determine rotation and mirroredness is described below.

a. The center of alignment marker 1 is placed at the origin of an x-y coordinate system and the positions of the other alignment markers are calculated relative to the origin, as shown below (see FIG. 9):

| | |
|---|---|
| $X_{1r} = 0$ | $Y_{1r} = 0$ |
| $X_{2r} = X_2 - X_1$ | $Y_{2r} = -(Y_2 - Y_1)$ |
| $X_{3r} = X_3 - X_1$ | $Y_{3r} = -(Y_3 - Y_1)$ |

Where $X_1, X_2, X_3, Y_1, Y_2,$ and $Y_3$ are the actual coordinates of alignment markers 1, 2 and 3 and $X_{1r}, X_{2r}, X_{3r}, Y_{1r}, Y_{2r},$ and $Y_{3r}$ are the coordinates of the alignment markers 1, 2, and 3 relative to dot 1. The calculations for the Y coordinates are made negative because in the image coordinate system, Y increases downward, while in a Cartesian coordinate system, Y increases upward.

b. The angle that alignment markers 1 and 3 make with the x-axis ($\theta_{13}$) may be calculated, as follows:

$$\theta_{13} = \tan^{-1}\left(\frac{Y_{3r}}{X_{3r}}\right)$$

Thus, an angle of 0° is calculated when alignment markers 1 and 3 are in a horizontal plane. This measurement is used to specify the rotation of the array.

c. The angle that alignment markers 1 and 2 make with the x-axis ($\theta_{12}$) may be calculated, as follows:

$$\theta_{12} = \tan^{-1}\left(\frac{Y_{2r}}{X_{2r}}\right)$$

d. To determine if the array is mirrored, $\theta_{13}$ and $\theta_{12}$ are compared. If $\theta_{13}$ is greater than $\theta_{12}$, then the array is not mirrored, otherwise the array is mirrored.

e. A check may be calculated to make sure the three alignment dots are in a proper formation and/or properly grouped. The angle between dots 2 and 3 may be calculated, as follows:

$$\theta_{23} = \theta_{13} - \theta_{23}$$

The angle $\theta_{23}$ should always equal ±45°. If angle $\theta_{23}$ does not equal ±45°, then there may be problem with the array and the results may be discarded.

f. Steps a-e may be repeated until the rotation and mirroredness of all groups have been calculated.

Figure 6:
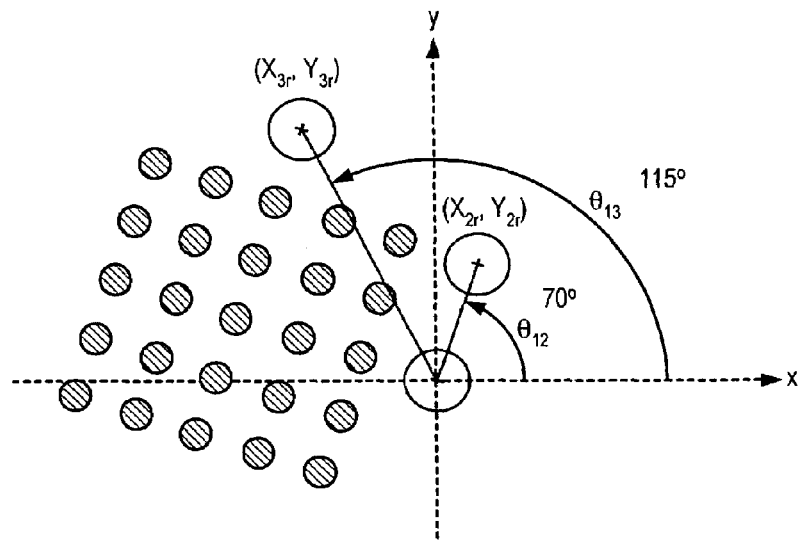
FIG. 6 depicts an embodiment of an array that is rotated.

Dot patterns and/or other patterns may be identified by the system. The positions of the alignment markers with respect to the array may change the equations below used in an embodiment of the invention. The equations may be altered to account for the position of the alignment markers. FIG. 6 shows an embodiment of the array. The equations below may be associated with the 5 by 5 array similar to the array of FIG. 6.

After the rotation and mirroredness of an array is known, the pattern of the elements of an array may be determined. An embodiment for the determination of the array pattern where elements of the array are arranged in a rectangular pattern is described below:

a. The locations of each element in the array may be calculated using the following equations:

$$X_{r,c} = X_1 + D_{1r,c} \times \cos(\theta_{13} \pm \theta_{1r,c})$$

$$Y_{r,c} = Y_1 - D_{1r,c} \times \sin(\theta_{13} \pm \theta_{1r,c})$$

where $X_{r,c}$ and $Y_{r,c}$ are the coordinates of the element in row r, column c; $X_1$ and $Y_2$ are the coordinates of alignment marker 1; $D_{1r,c}$ is the distance from alignment marker 1 to the element in row r, column c; and $\theta_{1r,c}$ is the angle that element at row r, column c makes with alignment marker 1. The ±mark inside the above two equations indicate that a minus sign should be used with the formula if the array is mirrored; otherwise, use a plus sign is used. The rows and columns are referenced from top to bottom and from left to right, respectively. Thus, the upper left element in FIG. 6 is in row 1, column 1, and the bottom right element is in row 5, column 5.

The distance $D_{1r,c}$ is calculated with the following equation:

$$D_{1r,c} = \sqrt{\left(\frac{D_L + 4D_L \cdot c}{4}\right)^2 + \left(\frac{D_L(2r - n_r - 1)}{2}\right)^2}$$

where $D_L$ is the alignment dot diameter, and $n_r$ is the number of rows in the array.

The angle $\theta_{1r,c}$ is calculated with the following equation:

$$\theta_{1r,c} = \tan^{-1}\left(\frac{2D_L(1 + n_r - 2r)}{D_L + 4D_L \cdot c}\right) + \frac{\pi}{4}$$

b. Each location at $(X_{r,c}, Y_{r,c})$ is searched for an element. If an element is in the vicinity, then its row and column coordinates are recorded. A tolerance range may be used to search a range around each specified location. The tolerance range may be ±10%.

c. Optionally, error checking is done on the pattern (see below).

d. The determined pattern is compared to a database of known patterns. If the determined pattern matches a known pattern, then a computer may retrieve information about the known pattern from the database. The known pattern may be associated with an analyte, thus facilitating analyte recognition. The known pattern may be associated with information about an item with an identification marking.

e. Steps a-d are repeated for all arrays in the image.

In some embodiments, the pattern may not be a regular array of elements. In some embodiments, the array may be a pattern as shown in FIG. 8. The array may be an array of characters and/or numbers. An embodiment of the system is shown below. The embodiment may be performed to prepare the image for external pattern recognition software, such as OCR. For each pattern, a rotation and/or mirroring algorithm is performed:

a. The size of the pattern is calculated:

$$X_{size}=2\sqrt{(d_{13})^2-(d_{12}+1.25D_L)^2}-2D_L$$

$$Y_{size}=2d_{12}+0.5D_L$$

These equations work when alignment markers 1 and 3 are placed on the central horizontal and vertical axes, and alignment marker 2 is placed in line with the bottom edge. The left and bottom edges are assumed to be located $D_L$ away from the centers of the alignment markers.

b. A copy of the unrotated, unmirrored pattern is made with dimensions $X_{size} \times Y_{size}$. This may be done by going through each pixel in the copied (unrotated) image and copying over the corresponding pixel in the rotated image. For each pixel in the copied image with coordinates ($X_c$, $Y_c$), the pixel from the rotated image with coordinates ($X_r$, $Y_r$) is copied. The values for $X_r$, $Y_r$ are:

$$X_r = X_1 + D_{1x,y} \times \cos(\theta_{13} \pm \theta_{1x,y})$$

$$Y_r = Y_1 - D_{1x,y} \times \sin(\theta_{13} \pm \theta_{1x,y})$$

where $X_1$ and $Y_2$ are the coordinates of alignment marker 1; $D_{1x,y}$ is the distance from alignment marker 1 to the pixel at coordinate ($X_c$, $Y_c$); and $\theta_{1x,y}$ is the angle that the pixel at coordinate ($X_c$, $Y_c$) makes with alignment marker 1. The ± mark inside the above equations indicates use of a minus sign if the array is mirrored and use of a plus sign otherwise. The rows and columns of pixels are referenced from top to bottom and from left to right, respectively. Thus, the upper left pixel in the image is at (0,0) and the lower right pixel is at ($X_{size}$, $Y_{size}$).

The distance $D_{1x,y}$ is calculated with the following equation:

$$D_{1x,y} = \sqrt{(D_L+X_c)^2+(d_{12}+0.25D_L-Y_c)^2}$$

where $D_L$ is the alignment marker diameter, and $d_{12}$ is the distance between alignment markers 1 and 2.

The angle $\theta_{1x,y}$ is calculated with the following equation:

$$\theta_{1x,y} = \tan^{-1}\left(\frac{d_{12}+0.25D_L-Y_c}{D_L+X_c}\right) + \frac{\pi}{4}$$

c. Steps a-b are repeated for each pattern in the image.

After the rotation and mirroredness of each array is determined, the pattern is compared to a database of known patterns. If the determined pattern matches a known pattern, then a computer may retrieve information about the known pattern from a database.

Error-checking/Correction for Arrays

If a dot or element in an array is missing or obscured, then the correct pattern may be misidentified. An error-checking scheme may be implemented in situations where missing or obscured dots or elements might occur.

Some digital error checking and correction algorithms involve transmitting a certain number of error checking bits along with the data bits. In an embodiment, parity checking may be included in the image recognition system. In parity checking, a single bit is marked as the parity bit. The rest of the bits are used for data. Each data bit is given a value of "1" if it is on or "0" if it is off. Then, the values of the data bits are added together. If the sum is even, then the parity bit is assigned "1". If the sum is odd the parity bit is set to "0". (This is called even parity—in odd parity, the parity bit is set to 1 if the sum of the data bit is odd, either parity system may be used for error checking.) When the data and parity bits are transmitted, their sum is calculated at the received end and the parity bit is determined. If the calculated parity bit is the same as the sent parity bit, then the data is assumed to be error-free.

In some embodiments, parity checking may be included in the pattern recognition system that includes a 5×5 element array. In some embodiments of a 5×5 element array including dot shaped elements, 24 of the dots could be data bits and one dot could be the parity bit. Elements may not be dot shaped, in certain embodiments. Using a single bit to error-check 24 other bits may not be a very robust system. If there is a single error, then the parity bit may switch and an error may be detected. If there are two errors in the array, the parity bit may remain the same and no error may be detected. Therefore, parity error checking may be limited to checking only 7-8 bits at a time. In some embodiments, as the number of data bits checked increases, the probability of having two or more errors increases.

By using a parity checking method involving additional error checking bits, the system may be more robust. In an embodiment of a 5×5 element array, the array could be split into two data sets, one 11 bit set and one 12 bit set, each set may have its own parity bit. Two errors in the array may be recognizable. If greater robustness is required, the array may be further subdivided.

In a system including parity checking, errors may be detected but they may not be corrected. The Hamming Code is an algorithm that sets error checking bits in such a way that single errors can be detected and corrected. It can be extended to detect (but not correct) double errors. The system of pattern recognition may utilize the Hamming Code. Various other error checking routines may be used. The error checking routine may correspond to the level of robustness needed for the system.

FIG. 8a depicts an embodiment of a 5×5 element array where the elements are represented by dots numbered 1-25 left-to-right, bottom-to-top. An embodiment of utilizing the Hamming Code with the 5×5 array, depicted in FIG. 8, to detect errors is described below.

a. Mark every dot position that is a power of two as an error checking bit, e.g. $2^0$=dot #1, $2^1$=dot #2, $2^2$=dot #4, etc. The remaining dots are used for data.

b. Each checking bit encodes for the parity of a certain number of bits:

i. Dot #1: Check 1 bit, skip 1 bit, check 1 bit, skip 1 bit, etc. (Dots 3,5,7,9,11, ... )
  (Dot 1 is ignored since it is the bit being calculated).
  ii. Dot #2: Check 2 bits, skip 2 bits, check 2 bits, skip 2 bits, etc. (Dots 3,6,7,10,11, ... )
  iii. Dot #4: Check 4 bits, skip 4 bits, check 4 bits, skip 4 bits, etc. (Dots 5,6,7,12,13,14,15, ... )

c. For each error-checking bit, set to "1" if the sum of the bits it checks for is odd; otherwise set to "0".

d. To extend the algorithm to detect double errors, designate the last bit as an overall parity bit covering both data and error checking bits. The values of all previous bits are summed, and the bit is set to "1" if the sum if odd, otherwise it is set to "0". This bit is not included in the above calculations.

Figure FIG. 8b shows a 5×5 element array with the array labeled as above. The data bits are D1-D19, the error checking bits are E1-E5 and the parity bit is P1.

To check a given array for errors, the following is performed:
a. Calculate the value of each error checking bit and compare it to the given value.
Calculate the value of the parity bit and compare to its given value.
b. A single error may be signaled by errors in one or more error checking bits and an error in the parity bit, OR no errors in the error checking bits and an error in the parity bit. It can be corrected—see step d.
c. A double error may be signaled by errors in one or more error checking bits, and no error in the parity bit. It cannot be corrected.
d. For single errors, add up the bit numbers of each incorrect error-checking bit. This sum gives the location of the error. For example, say that error-checking bits at positions 2 and 8 are incorrect. The sum of these position numbers is 10; therefore, there is an error in bit 10 than can be corrected. If all the error-checking bits are correct, then the error is in the parity bit itself.

EXAMPLE 1

Dot Recognition Algorithm

A fairly quick and simple technique for determining dot sizes and locations is described below. The system and method may work well for images with well-formed dots and low noise. The system and method has a low tolerance for defects., such as partial or malformed dots and miscellaneous debris in the image. The miscellaneous debris may appear similar to the dots. Methods that are more robust may be employed within the system as previously described, provided that the dot size and location information can be fed into the pattern recognition algorithm.

The computerized recognition of patterns may be broken down into several steps. Each of these steps is discussed in detail. First, however, a brief discussion about the nature of the images is needed.

The algorithms below describe how to process digital images stored in RGB (red-green-blue) format. This format is standard for computers, cameras, and video displays. Images are comprised of pixels, where each pixel corresponds to a certain color. A color is made by mixing the primary colors of light in different intensities (i.e. mixing red, blue and green). Each pixel is assigned an integer number that corresponds to its color. This number typically ranges from 0 to 16,777,215. This single number may be then broken down into three separate integer numbers describing the intensities of the red, green, and blue light. Typically, each of these three numbers may have a range of values from 0 to 255, with 0 being no intensity (black) and 255 being the highest intensity. For example, a pixel with RGB values of 255, 128, and 0 may be the mixture of bright red, medium green, and no blue. This mixture of colors may appear orange to the human eye.

Other systems besides RGB exist to describe images. For example, the CMYK (cyan-magenta-yellow-black) format is often used in the printing industry. It describes the four colors of the inks that are used. The HSV (hue-saturation-value) format is another common format. There are many other color formats. Regardless of the format that the image is in, the system and method may work with the appropriate modifications.

Some of the algorithms described below must convert the RGB color intensity values into a single intensity value (for example, when converting the image to grayscale). This conversion is done via the CIE (Commission Internationale d'Eclairage) LAB color model. The human eye may be responsive to green light, less responsive to red, and least responsive to blue. The CIELAB color model may account for human eye responsiveness when computing a single intensity from red, green, and blue by weighting each color differently. Green is given the most weight (0.589), followed by red (0.300) and blue (0.111). To construct a single intensity value, each color value is multiplied by its weight. Then, these values are added together. For example, take the color with RGB values 150, 100, and 250, which appears as a pale blue. First, each color is weighted: 150*0.300=45.0, 100*0.589=58.9, 250*0.111=27.8. Then these numbers are added to construct the single intensity value: 45.0+58.9+27.8 =131.7 =132. This may appear as a medium gray.

Before any software image processing is performed, an image containing the pattern(s) is input to the computer. This may be done in any number of ways. For example, a video camera that is focused on the pattern and coupled to the computer through a digitizer card can be used. A scanner may be used to scan in a photo of a dot pattern. The image of a dot pattern may be produced in drawing software. Various other methods for inputting images into computers may be used. The image may contain one or more patterns and may be any size that may fit into computer memory or disk storage. The image may be in color, grayscale, or black-and-white. The image file may be in any format (bitmap, JPEG, TIFF, GIF, etc.)

In some embodiments, the entire image is used for recognition of the pattern. Patterns that are cropped short by the sides of the image or are covered by opaque objects may cause inaccurate recognition. Dot patterns that are separated or in pieces may make pattern identification difficult. In an embodiment, there is sufficient contrast between the dot pattern(s) and the background such that the software may "see" them. Sufficient contrast may be as low as a single intensity unit on an RGB scale.

The size of a dot pattern may influence whether a pattern may be accurately recognized. This may depend on the robustness of the dot recognition algorithms. A dot pattern may include enough pixels that individual dots are distinguishable by computer-aided methods. An image may be in sufficient focus for identification. While some defects may be tolerated, the defects should be at a level that may not lead to inaccurate recognition. Missing alignment dots may cause inaccurate pattern recognitions.

Once the image is acquired, the actual dots in the dot patterns are recognized and cataloged. The purpose of this process is twofold: First, the dots specific to the dot patterns are recognized and sorted out from other artifacts in the image. Second, the sizes and positions of the recognized dots is determined.

Figure 9:
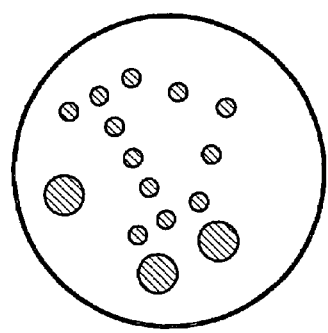
FIG. 9 depicts an embodiment of an image for recognition.

FIG. 9 shows a sample image. The method used to recognize the dots in the image is broken down into several steps. The result of each step is shown in subsequent figures.

This step is not required but it generally improves recognition capabilities. Typically the dots in the pattern are a different color from the background. A color filter is applied which eliminates colors that are not sufficiently similar to the colors of the dots (see FIG. 10). The color filtering method may be as follows:
a. Pick a color for the filter that corresponds to general tone of the dots. For example the dots may be a reddish tone. Call the RGB values of this color $R_f$, $G_f$, and $B_f$.
b. Pick a tolerance value $T_f$ between 0 and 255. A small tolerance value means that only colors very close to the filter color may be accepted. A tolerance between 20 and 40 may give accurate results.

c. Scan through the image, one pixel at a time. Call the RGB values of the current pixel $R_c$, $G_c$, and $B_c$.

d. For each pixel, compute the "distance" between the current color and the filter color.

$$D=\sqrt{A_R(R_f-R_c)^2+A_G(G_f-G_c)^2+A_B(B_f-B_c)^2}$$

where $A_R$, $A_G$, and $A_B$ are the red, green, and blue weighting coefficients for the CIELAB color model ($A_R$=0.300, $A_G$=0.589, $A_B$=0.111).

e. For each pixel, compare the distance D to the tolerance $T_f$. If the distance is less than or equal to the tolerance, then accept the color and leave it unchanged. Otherwise, color the pixel black (RGB=0,0,0).

Figure 10:
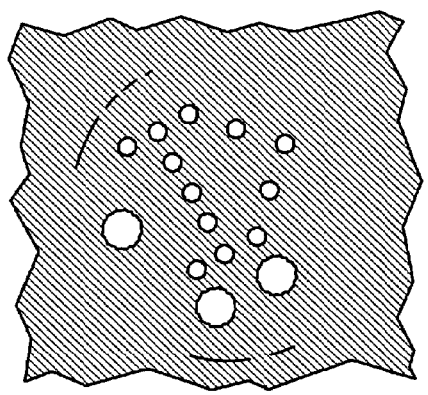
FIG. 10 depicts an embodiment of an image after color filtering.
Figure 11:
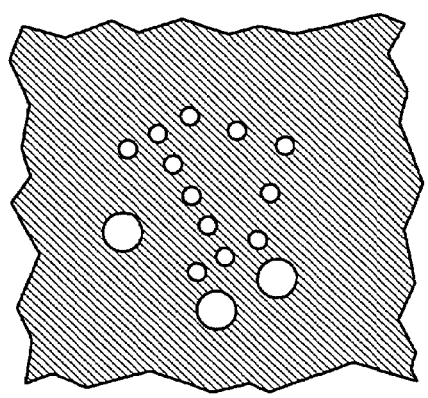
FIG. 11 depicts an embodiment of an image after median filtering.

This step is also optional but it can improve recognition capabilities. As shown in FIG. 10, some of the dots have jagged edges and there are some miscellaneous specks and extraneous debris. These artifacts are considered to be noise that may interfere with the recognition algorithms. There are several different types of filters than can be used to reduce noise (Gaussian, median, mode, etc.). FIG. 11 depicts the image after applying a "median" filter.

Small, bright specks existing in an otherwise dark area have a probability of being noise. Large bright areas are less likely to be noise and more likely to be the "signal". A noise filter can differentiate between noise and signal using these criteria. Noise may be removed or set to black and the signal may kept. As shown in FIG. 11, rough edges, bright spots, and extraneous features may be largely removed after filtering.

Image thresholding may be used before using an edge detection routine. Thresholding converts a color or grayscale image into a black-and-white image. Rather than being different colors or shades of gray, the pixels may be either on (white) or off (black). Many algorithms may be employed to perform image thresholding. An embodiment of image thresholding is described below.

a. Pick a threshold value T between 0 and 255. The best number to use depends heavily upon the image characteristics. Pixels with intensities below this threshold may be turned to black and pixels equal to or greater than this value may be turned to white.

b. Scan through the image one pixel at a time. For each pixel, compute a single intensity value I from its three color intensities:

$$I=A_R \cdot R_c + A_G \cdot G_c + A_B \cdot B_c$$

where $A_R$, $A_G$, and $A_B$ are the red, green, and blue weighting coefficients for the CIELAB color model ($A_R$=0.300, $A_G$=0.589, $A_B$=0.111) and $R_c$, $G_c$, and $B_c$ are red, green, and blue components of the current pixel.

c. Compare I to the threshold T. If I is less than T, then change the current pixel color to black (RGB=0,0,0). Otherwise, change the current pixel color to white (RGB=255,255,255).

After image thresholding it may be desirable to locate the edge of the elements in a pattern or the edge of the pattern. The edge detection procedure may require a binary image or one that has been thresholded. Some edge detection algorithms may not depend on a binary image.

Figure 12:
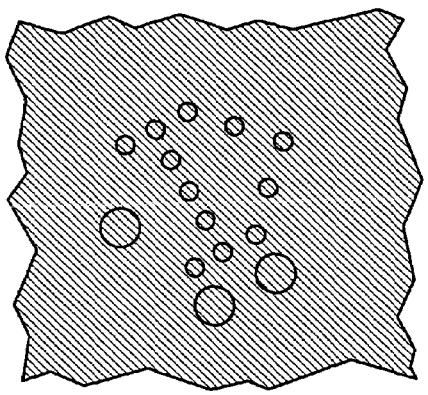
FIG. 12 depicts an embodiment of an image after edge detection.

In a binary image, edges are easy to locate. They are simply at points where a white pixel is adjacent to a black one. The edge detection algorithm colors the edges white and everything else black. A 1-pixel wide white outline is drawn around all objects (see FIG. 12). Edge detection may be employed as follows:

a. Scan through the entire image, one pixel at a time. Get the color of the current pixel ($I_c$), the pixel to its left ($I_l$), and the pixel below it ($I_b$).

b. Compare the current pixel $I_c$ to the one on its left $I_l$. There are three possible cases:
   i. $I_c=I_l$: There is no edge. Color the current pixel black.
   ii. $I_c$=white, $I_l$=black: There is an edge at the current pixel. Color the current pixel white, and the pixel to its left black.
   iii. $I_c$=black, $I_l$=white: There is an edge left of the current pixel. Color the current pixel black and the pixel to its left white.

c. Compare the current pixel $I_c$ to the one below it $I_b$. There are three possible cases:
   i. $I_c=I_b$: There is no edge. Color the current pixel black.
   ii. $I_c$=white, $I_b$=black: There is an edge at the current pixel. Color the current pixel white, and the pixel below it black.
   iii. $I_c$=black, $I_l$=white: There is an edge below the current pixel. Color the current pixel black and the pixel below it white.

Figure 13:
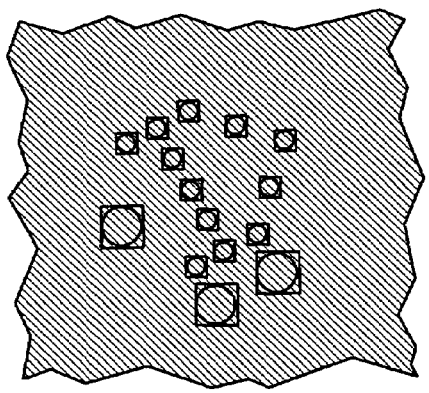
FIG. 13 depicts an embodiment of an image after shape detection.

The purpose of the shape detection routine is to find individual objects in the image and determine their size and location (See FIG. 13). Shape detection may be an important step because dot array patterns are based on dot sizes and locations.

The shape detection method described below is a tracing step that traces around 1-pixel wide edges. Shape detection may be facilitated by thresholding and subsequent edge detection. Some shape detection methods may not require 1-pixel wide edges. Some of these methods trace, while others do transforms and histogram analysis. Described below is an example of a shape detection method.

a. Scan through the image, one pixel at a time. Get the color of the current pixel ($I_c$), b. If the current pixel $I_c$ is black, then go back to step a. Otherwise continue to step c.

c. If the current pixel is white, then an edge is found. Store the coordinates of this pixel as $X_c$, $Y_c$.

d. Trace around the edge by looking around the current pixel and finding adjacent white pixels. Store each pixel found.

e. End the tracing when there are no more adjacent white pixels or when the starting position $X_c$, $Y_c$ is reached.

f. Each trace is considered to be an object. Store the width, height, area, perimeter, and center point of each object.

g. Go back to the starting point $X_c$, $Y_c$ and continue scanning with Step a.

Elimination of extraneous objects and debris may reduce the amount of recognized objects. To sort dots, elements, or the image to be recognized from debris, several approaches may be taken:

a. Objects that are not circular can be removed. A roundness calculation can be performed on the image based on its perimeter P and its area A:

$$R=\frac{P^2}{4\pi A}$$

For a perfect circle, the roundness R may equal 1. Any other shape may have a roundness greater than 1. Thus, a threshold roundness value can be set to remove all shapes with roundness greater than that threshold.

b. Circles have equal heights and widths. Objects with unequal heights and widths (i.e. objects that are rectangular) can be removed. A tolerance can be set to define the range of acceptable height/width ratios.

c. If the size of the dots is known, then dots too small or too large can be excluded. The size of the dots in this case is area.

Once the pattern has been isolated from the detected image, rotation and mirroredness of the pattern may be determined from alignment markers. Three or more alignment markers may provide information about the pattern orientation to facilitate accurate identification. The isolated pattern may be compared to a catalog of known patterns where the pattern orientation is taken into account.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A sensor array configured to detect an analyte comprising:
   an array of sensing elements arranged on a support in a pattern that identifies the array or analytes that bind to the array, said support comprising a front side and back side, wherein one or more sensing elements are configured to produce a detectable signal in the presence of an analyte, said signal detectable from either said front side or said back side; and three or more alignment markers, wherein said three or more alignment markers are of different size than said sensing elements and are positioned proximate to the array, wherein alignment markers are positioned such that the mirroredness of the pattern is determined by the position of the alignment markers.

2. The sensor array of claim 1, wherein the sensing elements comprise a plurality of particles disposed in one or more cavities.

3. The sensor array of claim 1, wherein the sensing elements comprise a plurality of regions of said a support.

4. The sensor array of claim 1, wherein the sensing elements comprise a probe for detecting a complementary nucleic acid.

5. The sensor array of claim 1, wherein the alignment markers are approximately two times the size of the sensing elements.

6. The sensor array of claim 1, wherein each of the alignment markers are distinguishable from the other alignment markers.

7. The sensor array of claim 1, wherein at least one alignment marker has a shape or size that is related to the number of sensing elements in the array.

8. The sensor array of claim 1, wherein each of the alignment markers provides information related to the array.

9. The sensor array of claim 1, wherein at least two alignment markers are positioned proximate a first edge of the array, and wherein at least one alignment marker is positioned proximate a second edge adjacent to the first edge.

10. The sensor array of claim 1, wherein an alignment marker indicates the center of the array.

11. The sensor array of claim 1, wherein one or more alignment markers identify one or more edges of the array.

12. The sensor array of claim 1, wherein one or more alignment markers indicate the size of the array.

13. The sensor array of claim 9, wherein the distance between said alignment marker on said second edge and said two alignment markers on said first edge is about twice the distance between said two alignment markers on said first edge, and said distance conveys information about the array.

14. The sensor array of claim 1, wherein the array comprises one or more error checking elements, wherein one or more error checking elements are used to determine if errors occurred when the sensing elements are read and to correct said errors.

15. A sensor array configured to detect an analyte comprising: an array of sensing elements comprising a dot pattern that identifies the array or analytes that bind to the array on a support, each said support comprising a front side and a back side, and edges, wherein at least one dot of said dot pattern is configured to produce a detectable signal in the presence of an analyte, said signal detectable from either said front side or said back side; and three or more alignment markers associated with said array and positioned on at least two of said edges said alignment markers positioned outside said dot pattern and being of different size than said dots such that the mirroredness of the pattern is determined by the position of the alignment markers.

16. The sensor array of claim 15, wherein at least two alignment markers are positioned proximate a first edge of the array, and wherein at least one alignment marker is positioned proximate a second edge adjacent to the first edge.

17. The sensor array of claim 16, wherein the distance between said alignment marker on said second edge and said two alignment markers on said first edge is about twice the distance between said two sensing elements on said first edge, and said distance conveys information about said array.

18. The sensor array of claim 15, wherein the sensing elements comprise a receptor, wherein the receptor is configured to interact with the analyte.

19. A plurality of sensor arrays configured to detect an analyte comprising:
   a plurality of transparent, polymeric sensor arrays, at least a portion of which are positioned in different orientation relative to said other arrays, each sensor array comprising a front side, a back side, and a dot pattern that identifies the array or analytes that bind to the array, wherein at least one dot of said dot pattern on at least one sensor is configured to produce a detectable signal in the presence of an analyte, said signal detectable from either said front side or said back side of said sensor; and three or more alignment markers positioned on each array such that the mirroredness of the pattern is determined by the position of the alignment markers.

20. The plurality of sensor arrays of claim 19, wherein each array of said plurality of polymeric sensors arrays are on a separate support.

21. The plurality of sensor arrays of claim 19, wherein a portion of said sensing arrays are in a rotated orientation relative to said other arrays.

22. The plurality of sensor arrays of claim 19, wherein a portion of said arrays are in a mirrored orientation relative to said other arrays.

23. A plurality of sensor arrays, each array having an orientation that is independent and different from all other arrays in said plurality of sensor arrays, said orientation comprising rotation and mirroredness, each array comprising a) sensing elements, arranged in a pattern that identifies the array or analytes that bind to the array, on a support, said support comprising a front side and back side, wherein one or more sensing elements are configured to produce a detectable signal in the presence of an analyte, said signal detectable from either said front side or said back side; and b) at least three alignment markers positioned proximate to the array, wherein alignment markers are positioned such that the orientation of each pattern is determined by the position of the alignment markers.

24. The plurality of sensor arrays of claim 23, wherein said arrays are transparent.

25. The plurality of sensor arrays of claim 23, wherein a portion of said plurality of arrays are in a rotated orientation relative to other arrays in said plurality of arrays.

26. The plurality of sensor array of claim 23, wherein a portion of said plurality of arrays are in a mirrored orientation relative to other arrays in said plurality of arrays.

27. The plurality of sensor arrays of claim 26, wherein each array is a 5×5 element array and wherein, for said portion of arrays in a mirrored orientation, all said elements are mirrored.

* * * * *

UNITED STATES PATENT AND TRADEMARK OFFICE
CERTIFICATE OF CORRECTION

PATENT NO. : 7,651,850 B2
APPLICATION NO. : 10/847635
DATED : January 26, 2010
INVENTOR(S) : Meiring et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twenty-third Day of November, 2010

David J. Kappos
*Director of the United States Patent and Trademark Office*